Dec. 23, 1969  ÖIVIND JERVAN  3,485,464
RETRACTABLE LANDING GEAR

Filed Aug. 14, 1967   2 Sheets-Sheet 1

INVENTOR
ÖIVIND JERVAN

BY James E. Bryan
ATTORNEY

United States Patent Office 3,485,464
Patented Dec. 23, 1969

3,485,464
RETRACTABLE LANDING GEAR
Öivind Jervan, Rosenweg, Germany, assignor to Dornier G.m.b.H., Friedrichshafen (Bodensee), Germany, a corporation of limited-liability of Germany
Filed Aug. 14, 1967, Ser. No. 660,381
Claims priority, application Germany, Aug. 24, 1966,
D 50,928
Int. Cl. B64c 25/12, 25/16
U.S. Cl. 244—102                                    10 Claims

ABSTRACT OF THE DISCLOSURE

This invention relates to a retractable landing gear including at least two wheels, separate suspension means for each wheel, and means for retracting the wheels from a lowered position in which they are parallel to a retracted position in which they are substantially coplanar.

---

Figure 1:
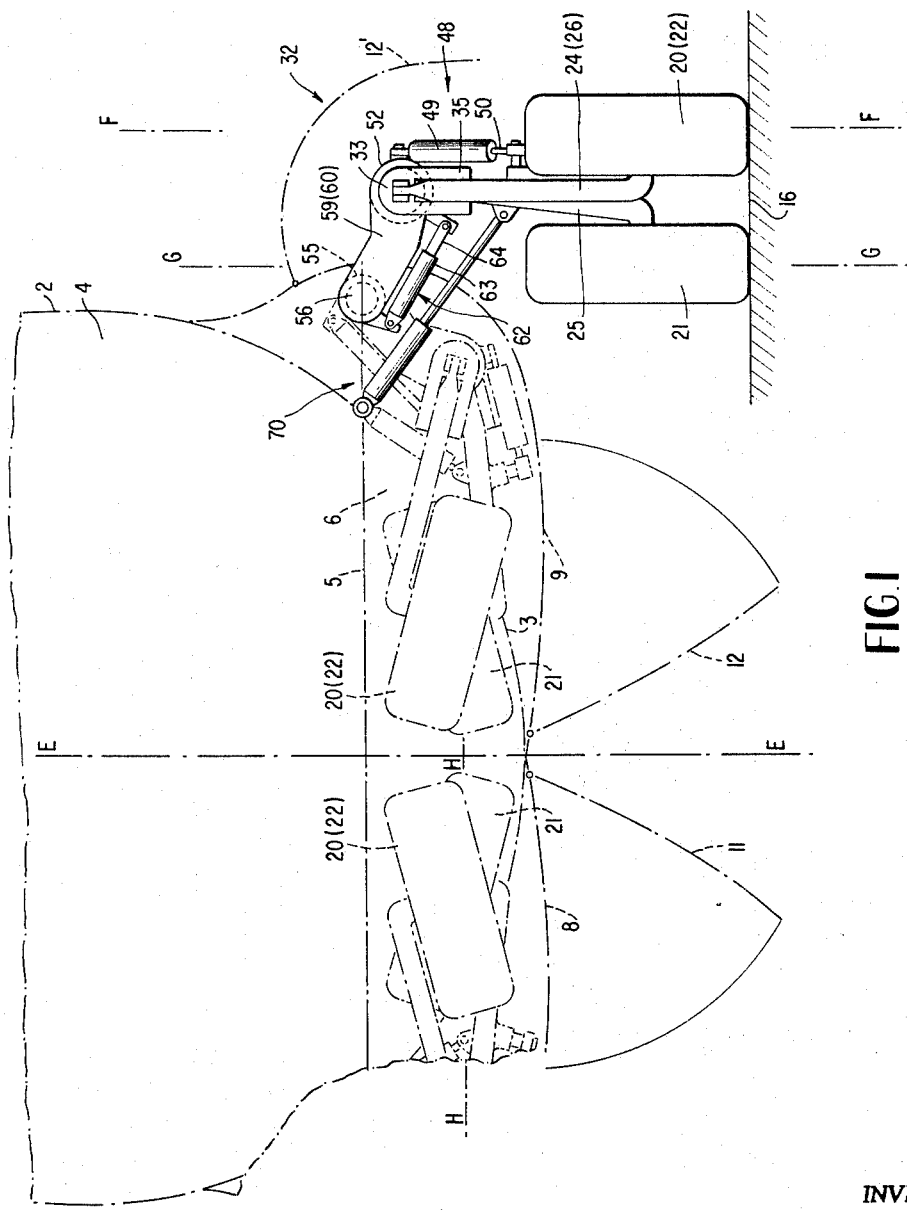

In landing gears, it is known to mount the wheels in pairs or in two pairs. It is also known, particularly in the case of heavier aircraft, to mount a plurality of wheels in tandem. The mounting in pairs may be employed both for the main landing gear and for the nose gear.

The mounting of landing gear wheels in pairs results in disadvantages when the gear is retracted because wheels so mounted require a relatively large amount of space and larger landing gears reduce the useful space within an aircraft. This disadvantage is particularly significant in aircraft constructions in which protruding housings are mounted at the fuselage for receiving the landing gear. These housings must be sufficiently large to accommodate the landing gear and, therefore, have a relatively large end face and surface, with the result that a considerable increase in aerodynamic drag is produced.

While landing gears having wheels mounted in tandem avoid the aforementioned disadvantages, other drawbacks are present instead. For example, features which are extremely disadvantageous where more than two wheels are mounted in tandem are the length of the wheelbase between the foremost and rearmost wheels at the time when the aircraft rolls through a curve, with the result of scuffing of the tires, and the control or steering of such an aircraft on the ground requires undesirably large forces.

The present invention effectively obviates the disadvantages and drawbacks inherent in the known types of landing gears and provides a gear which requires as limited a space as possible in the retracted position while simultaneously assuring an improved steering or control behavior on the ground.

In the landing gear of the present invention, each of the wheels has a separate resilient suspension system and mounting and the wheels are shifted from a side-by-side poition in parallel planes in the lowered position, into a position, or approximately a position, in a plane common to all of the wheels in the retracted position. A further feature of the present invention for the construction of a landing gear in which the wheels are mounted in tandem in at least one of the planes, is that the wheelbase of the foremost and rearmost landing gear wheels is as small as possible when in the lowered position, and all of the wheels are displaced in a staggered manner with respect to each other for the retracting operation and may be position in parallel planes in the lowered position, into a common plane.

A landing gear in accordance with the present invention, with a mounting of the wheels in pairs, may be accommodated within a minimum amount of space and, thus, permits for receiving the landing gear and the resilient suspension system thereof, together with the required moving and shock absorbing device in a minimum space, while requiring, in the retracted position, only a small amount of additional space as compared to landing gears having a tandem mounting of the wheels.

In addition, in a case where more than two wheels are employed, for example when one landing gear unit is mounted on both sides of the longitudinal central plane of an aircraft, this construction affords the advantage that, despite the smallest possible dimensions of the wheelbase being provided for in the lowered position of the landing gear, only the most limited amount of space is required to the cross-section of the aircraft fuselage.

The construction of the present invention is equally suitable for nose gears as well as for main landing gears with the wheels being mounted either in the longitudinal central plane of the aircraft or in landing gear units on both sides of the central plane. Moreover, the advantage of the favorable retracted position of gear wheels which, in the lowered position thereof are mounted in tandem, exists equally for the present landing gear in that the wheels are adapted to be pivoted into a common plane either side-by-side or in tandem. The shifting or displacement of adjacent wheels may be effected in all cases both by pivoting about axes parallel to the longitudinal aircraft axis and also by means of hinge-like movements into a common plane extending in the direction of the longitudinal aircraft axis, for the retracting operation.

Figure 2:
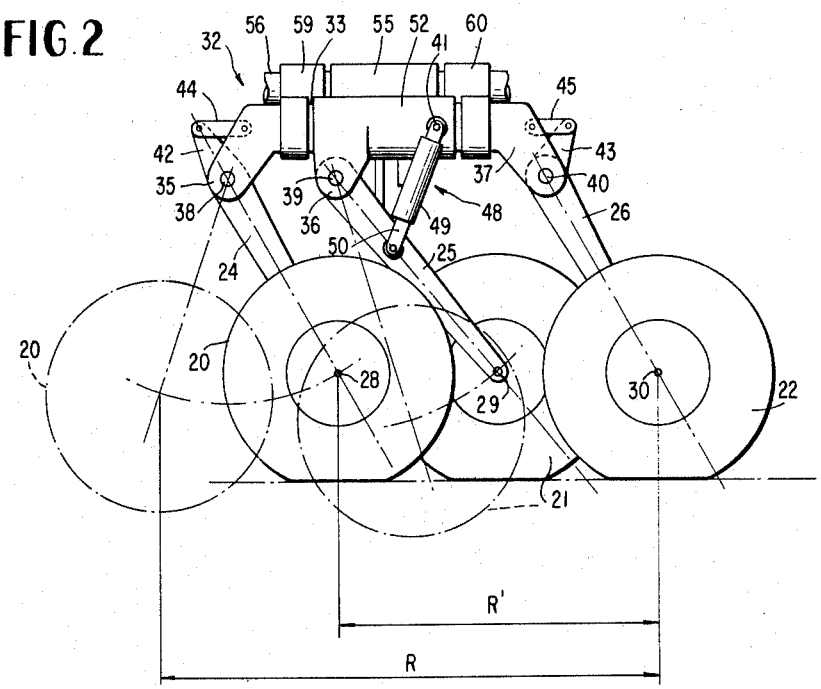
Figure 3:
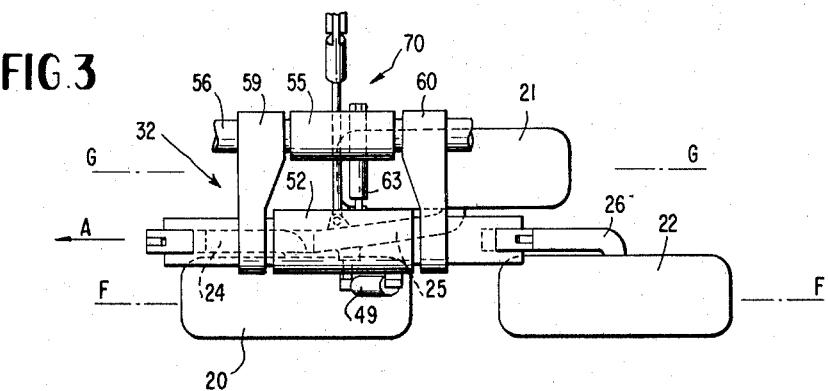

One embodiment of the present invention is illustrated in the accompanying drawings in which FIGURE 1 is a front view of a landing gear according to the present invention in the lowered position thereof mounted on an aircraft shown in phantom, the retracted position also being shown in phantom, FIGURE 2 is a side view of the landing gear of the present invention in the lowered position thereof, the position of the wheels in the retracting position being shown in phantom, and FIGURE 3 is a top view showing the position of the landing gear wheels in the lowered position thereof.

The embodiment illustrated in the drawings is constructed as a so-called jockey landing gear. Mounted on both sides of the vertical longitudinal central plane of an aircraft are landing gear units with three wheels each and the respectively connected moving mechanisms, pivot mountings, servomotors, and shock-absorbing devices. Since the landing gear units are identical on both sides, only one will be described hereinafter. The construction of the landing gear of the present invention is not limited to jockey-type landing gears as mentioned above, but other types of landing gears equally may be constructed in the same manner.

In FIGURE 1, reference numeral 2 identifies an aircraft fuselage and reference numeral 4 designates the load-carrying and passenger space thereof. Within the area of the lower fuselage shell 3 and within the fuselage itself, a floor 5 is provided for supporting loads or passenger seats. Between the lower fuselage shell 3 and the floor 5 a well 6 is formed which is utilized in a manner generally known for receiving the landing gear in the retracted position. At the lower fuselage shell 3, the bulges 8 and 9, respectively, are provided which bulges project beyond the circumferential contour of the fuselage and into which the landing gear may be retracted. The openings in the bulges for the retracting and lowering operations of the landing gear may be closed off by means of the flaps 11, 11', and 12, 12', respectively, which latter are in operative engagement with the landing gear. The pivot bearings of the landing gear are mounted either on one or several adjacent bulkheads of the fuselage assembly. Reference numeral 16 indicates the landing strip. Reference letters E—E indicate the vertical longitudinal central plane of the aircraft while A (FIGURE 3) indicates the flying direction. Further, reference letters F—F and G—G are employed to identify parallel planes of the landing gear wheels in the lowered position thereof.

FIGURES 2 and 3 illustrate the details of the landing gear construction. Reference numerals 20, 21, and 22 designate the landing gear wheels which are mounted by means of the wheel axles 28, 29, and 30, at the free ends of the rocking arms 24, 25, and 26, respectively, which latter constitute, together with transmitting members which are connected with a shock-absorbing device, the resilient suspension of the landing gear wheels. Reference numeral 32 identifies a device which simultaneously assumes the function of shock absorption and displacement of the landing gear wheels during retracting or lowering operations. Such devices are generally known to the art and, therefore, are not described in detail herein. The device 32 consists essentially of a cylindrical housing 33, the longitudinal axis of which extends parallel to the longitudinal axis of the aircraft, and serves for receiving shock-absorbing and setting or adjusting pistons. At the same time, the cylindrical housing 33 serves as a supporting element and includes bifurcated supporting elements 35 and 37, which act as hinged connections, and form, together with the rocking axles 38 and 40, the mounting supports for the rocking arms 24 and 26, respectively. The latter arms include one lever arm each, 42 and 43, respectively, which projects beyond the axles 38 and 40, respectively, and the free end of which is hingedly connected to the shock-absorbing and adjusting or setting pistons, not shown, by means of the connecting links 44 and 45, respectively. A pivot bearing 52 serving as a carrier or supporting element is mounted concentrically with respect to the cylindrical housing 33 and is freely rotatable with respect thereto. The pivot bearing 52 comprises, on the one hand, a pivotal connection, being constructed as a bifurcated support 36 with a bearing axle 39, for purposes of pivotal connection of the central rocking arm 25 and, on the other hand, a pivotal connection 41 for the cylindrical housing 49 of a shock-absorbing and displacing device 48 which operates in dependence upon the device 32. The piston 50 of the device 48 is pivotally connected to the rocking arm 25. The cylindrical housing 33 is rigidly secured to two supporting arms 59 and 60, respectively, which may freely rotate on the pivot axle 56. The pivot axle 56 is received in a mounting support or bearing 55 being mounted on a bulkhead of the aircraft fuselage 2. Inserted between the mounting support 55, which is rigidly secured to the aircraft, and the rocking arm 25 for the gear wheel 21 is hydraulically operated displacing or shifting device 62. The cylindrical housing 63 thereof is pivotally connected to the mounting support 55, which latter is rigidly mounted on the aircraft, and the setting or adjusting piston 64 thereof is pivotally connected to the pivot bearing 52.

Provided in known manner for purposes of retracting and lowering the landing gear is the displacing device 70 which operates hydraulically, for example, as well as a device for controlling the pressure medium, not shown. Finally, the wheelbase between the foremost and rearmost landing gear wheels in the lowered position and in the retracted position have been indicated by R' and R, respectively, and the common plane of the landing gear wheels in the retracted position thereof has been identified with reference letters H—H (FIGURE 1). The landing gear wheels are positioned, in the embodiment shown, only approximately in the plane H—H in the retracted position thereof. Structurally, however, it is apparent that the landing gear wheels could be pivoted precisely into the common plane H—H, although greater structural expenditures are required.

The operation of the disclosed embodiment is as follows: In the lowered position of the landing gear, as illustrated in FIGURES 1 to 3, the two landing gear wheels 20 and 22 are mounted in a common plane F—F which is parallel to the vertical longitudinal central plane E—E of the aircraft. The third wheel 21, in turn, is mounted in the plane G—G, which is parallel to the aforementioned planes on the inside of the landing gear wheels 20 and 22. The distance R' of the wheel axles 28 and 30 which respect to each other is made as small as possible so that the two outer wheels and the wheel 21, which latter is positioned approximately in the center between the two outer wheels 20 and 22 in the direction of the longitudinal aircraft axis, will partially overlap one another.

When the retracting operation is initiated, the foremost landing gear wheel 20 is pivoted by means of the displacing device 32, and the inwardly-positioned wheel 21 is pivoted by means of the displacing device 48 in the direction of further movement of the aircraft (arrow A) about the pivot bearings 35, 38, and 36, 39, respectively, into a position in which all of the wheels 20, 21, and 22 are positioned in a staggered arrangement, with small distances between them, in the direction of the longitudinal aircraft axis. The displacing device 32 may operate in a manner such that the displacing and shock-absorbing piston of the rearmost landing gear wheel 22 is locked and the pressure within the hydraulic system is increased so that, as a reuslt, the piston for the foremost wheel 20 has a corresponding displacement imparted thereto. Subsequent to this displacement, or simultaneously therewith, the main retracting movement of the landing gear is initiated, with the air of the displacing device 70, at which time all of the wheels 20, 21 and 22 are pivoted about the axle 56 into the landing gear wells 8 and 9, respectively, and into the space 6 within the aircraft fuselage 2. During this pivoting operation, the inwardly-positioned landing gear wheel 21 with the rocking arm 25 thereof, has imparted thereto, by way of the pivot bearing 52 and the displacing device 62, a relative pivoting movement which is opposite to the pivoting movement of the entire landing gear as such. As a result of this relative movement, the inwardly-positioned wheel 21 is pivoted approximately into the plane H—H which is common to all of the wheels. The displacing and shock absorbing device 48 may be in operative engagement with the hydraulic system of the device 32 and, thus, may operate in dependence upon the latter. In such case, the shock-absorbing device 48 of the inwardly-positioned landing gear wheel 21 must be so dimensioned that it is adapted to absorb one-third of the total load to be supported by the landing gear. When the retracting procedure is completed, the landing gear, in the retracted position thereof, requires only a minimum amount of space with regard to the cross-section of the aircraft fuselage and the aerodynamic drag areas of the bulge-like housings 8 and 9 at the aircraft fuselage 2 may be made with the smallest possible dimensions. In the lowered position, the distance R' between the axle of the foremost and rearmost wheels 20 and 22, respectively, is maintained as small as possible, due to the changed position of the wheels 20, 21, and 22, and scuffing of the tires when rolling through curves is thereby eliminated to a large extent.

It will be obvious to those skilled in the art that many modifications may be made within the scope of the present invention without departing from the spirit thereof, and the invention includes all such modifications.

What is claimed is:

1. A retractable landing gear comprising at least two wheels, separate suspension means for each wheel, and means for retracting the wheels from a lowered position in which they are parallel to a retracted position in which they are substantially coplanar, the means for retracting the wheels including means for moving at least two wheels relative to each other in a longitudinal direction and at least one wheel relative to the other in a transverse direction, said latter means including separate means connected to supports for at least two wheels for moving them relative to each other in a longitudinal direction and at least one relative to the other in a transverse direction, the separate means being connected to a common supporting means, the common supporting means comprising a pair of concentric cylindrical elements.

2. A retractable landing gear according to claim 1 in which the concentric cylindrical elements are rotatable with respect to each other.

3. A retractable landing gear according to claim 2 in which the inner concentric cylindrical element is a housing of a combination shock-absorbing and wheel moving means.

4. In combination, an aircraft having a longitudinal axis, a landing gear assembly disposed on both sides of said axis, each landing gear assembly including at least three wheels, separate suspension means for each of said wheels, at least one of said wheels being disposed in spaced parallel relationship to another of said wheels and at least partially over-lapping said other wheel in a direction parallel with said longitudinal axis when the wheels are in lowered position, and means for retracting said wheels to a retracted position wherein all of the wheels of each landing gear assembly are substantially coplanar and are substanially aligned in a row in a direction extending substantially parallel with said longitudinal axis.

5. A retractable landing gear according to claim 4 in which the means for retracting said wheels includes means for moving at least two wheels relative to each other in a longitudinal direction and at least one wheel relative to another wheel in a transverse direction.

6. A retractable landing gear according to claim 5 in which the latter means includes separate means connected to supports for at least two wheels for moving them relative to each other in a longitudinal direction and at least one relative to the other in a transverse direction.

7. A retractable landing gear according to claim 6 in which the separate means are connected to a common supporting means.

8. A retractable landing gear according to claim 7 in which the common supporting means comprises a pair of concentric cylindrical elements.

9. A retractable landing gear according to claim 8 in which the concentric cylindrical elements are rotatable with respect to each other.

10. A retractable landing gear according to claim 4 including at least two wheels in tandem in the lowered position.

References Cited

UNITED STATES PATENTS

| 2,925,968 | 2/1960 | Sharples | 244—102 |
| 3,188,026 | 6/1965 | Perdue et al. | 244—102 |
| 3,315,919 | 4/1967 | Perdue | 244—102 |
| 3,338,535 | 8/1967 | Lucien | 244—102 |

FOREIGN PATENTS

| 720,453 | 5/1942 | Germany. |
| 640,741 | 7/1950 | Great Britain. |
| 1,007,220 | 10/1965 | Great Britain. |

MILTON BUCHLER, Primary Examiner

P. E. SAUBERER, Assistant Examiner